United States Patent
Kukaleva et al.

(10) Patent No.: US 8,703,836 B2
(45) Date of Patent: Apr. 22, 2014

(54) MODIFIED OLEFIN POLYMERS

(75) Inventors: Natalia Kukaleva, Riehen (CH); Klaus Stoll, Binzen (DE); Marcel Santi, Sissach (CH)

(73) Assignee: BASF SE, Ludwigshafen (DE)

( * ) Notice: Subject to any disclaimer, the term of this patent is extended or adjusted under 35 U.S.C. 154(b) by 133 days.

(21) Appl. No.: 12/812,790

(22) PCT Filed: Jan. 7, 2009

(86) PCT No.: PCT/EP2009/050100
§ 371 (c)(1),
(2), (4) Date: Jan. 13, 2011

(87) PCT Pub. No.: WO2009/090126
PCT Pub. Date: Jul. 23, 2009

(65) Prior Publication Data
US 2011/0136931 A1    Jun. 9, 2011

(30) Foreign Application Priority Data
Jan. 17, 2008 (EP) .................................... 08150365

(51) Int. Cl.
C08F 2/46 (2006.01)
C08G 61/04 (2006.01)

(52) U.S. Cl.
USPC .................................................. 522/1; 520/1

(58) Field of Classification Search
USPC .................................................. 522/1; 520/1
See application file for complete search history.

(56) References Cited

U.S. PATENT DOCUMENTS

| 6,048,660 | A * | 4/2000 | Leppard et al. ............ 430/270.1 |
| 6,251,963 | B1 * | 6/2001 | Kohler et al. .................... 522/64 |
| 2001/0020047 | A1 * | 9/2001 | Lau et al. ......................... 522/33 |
| 2007/0026509 | A1 | 2/2007 | Rogers et al. |
| 2008/0013780 | A1 | 1/2008 | Kobayashi et al. |
| 2008/0193677 | A1 | 8/2008 | Romagnano et al. |
| 2009/0202791 | A1 | 8/2009 | Nakamura et al. |
| 2010/0227940 | A1 | 9/2010 | Pinto et al. |

FOREIGN PATENT DOCUMENTS

| EP | 0615980 A | 9/1994 |
| EP | 0 921 152 A | 6/1999 |
| EP | 1674513 A1 | 6/2006 |
| EP | 1958968 A1 | 8/2008 |
| WO | 2004108799 A1 | 12/2004 |
| WO | 2006/120212 A | 11/2006 |
| WO | 2007107667 A1 | 9/2007 |

OTHER PUBLICATIONS

Qu, Bao Jun and Bengt Ranby, "Photocross-linking of Low-Density Polyethylene, Journal of Applied Polymer Science", 1993, vol. 48, pp. 701-709.*
English Language abstract of EP 0615980 printed on Oct. 12, 2010.
English Language abstract of EP 1674513 printed on Jun. 28, 2006.
Larousse. fr, "Ultraviolet" printed Aug. 17, 2012.
Fusion UV Systems Ltd, "Convoyeur LC6E" Dec. 13, 2001.
Lastics Design Library, "Polypropylene" 1998.

* cited by examiner

*Primary Examiner* — Ling Choi
*Assistant Examiner* — Jessica E Whiteley
(74) *Attorney, Agent, or Firm* — Tyler A. Stevenson

(57) ABSTRACT

A composition comprising the Components (A) at least one linear olefin polymer; (B) 0.05 to 2%, relative to the weight of Component (A), of at least one photoinitiator; and (C) 0.05 to 5%, relative to the weight of Component (A), of at least one co-additive containing one or more double bonds.

25 Claims, No Drawings

MODIFIED OLEFIN POLYMERS

The present invention relates in particular to a composition comprising a linear olefin polymer, a photoinitiator and a co-additive containing one or more double bonds, as well as to the modified olefin polymer resin obtainable by the reaction thereof. Using current invention, it is possible to modify, i.e., to branch or cross-link polypropylene (PP) and other non-crosslinkable by conventional means polymers.

The modified olefin polymers of the present invention have High Melt Strength (HMS) through an addition of photoinitiators and co-additives containing one or more double bonds and through the action of UV radiation. Melt Strength is understood as the maximal "tension" that can be applied to the polymer melt without rupture and this "tension" is proportional to a product of the maximal possible stretching force and the maximal possible melt stretching speed. Stretching force correlates with the melt stiffness and stretching speed corresponds to the melt extensibility, or toughness. Naturally, these two properties—stiffness and toughness in either molten or solid state—tend to be inversely proportional, i.e., stiffness decreases dramatically with increasing toughness/extensibility.

The current invention provides a simple and economical method for the manufacture of modified olefin polymer melt which has an improved balance of stiffness and extensibility. More broadly, the invention relates to the process of producing a polymer melt with any desired stiffness-extensibility balance.

Polypropylene (PP) as a versatile polymer is constantly subjected to further developments aiming at higher levels of mechanical properties. However, its application is limited in several processing technologies, where the polymeric melts are stretched, e.g., in thermoforming, extrusion coating, film blowing, foam extrusion, blow moulding and fibre/filament spinning. The narrow processing window and/or reduced output/operation speed results from weakness of polypropylene melt that readily tears under tension, as linear molecules slide along each other without much restriction. Presence of long chain branching in polymers favours the chains entanglement and leads to an increase in the stiffness and extensibility of the melt, as evident from comparison of behaviour of linear "Linear Low Density Polyethylene" (LLDPE) and branched "Low Density Polyethylene" (LDPE) melts in stretching. Up to date, existing Ziegler-Natta and metallocene catalyst technologies do not have easy solutions for synthesis of long-chain branched PP (or LLDPE).

In principle however, during production process, it is possible to improve melt strength of PP by an alternative pathway, e.g., via Molecular Weight Distribution (MWD) broadening. This can be achieved by means of polymerization of propylene in the multiple connected reactors. But such modifications are applicable only by the producer during the manufacture process, and thus, remain restricted to production plants.

As a rule, broadening of MWD does result in an improvement of melt properties of linear polymers, e.g., shear thinning, but, often, it affects adversely mechanical properties in the solid state, especially, modulus. As a possible solution for large part injection moulding applications, a so-called Controlled Rheology Polypropylene (CRPP) has been developed. CRPP is characterized by high Melt Flow Index (MFI), low Molecular Weight (MW) and narrow Molecular Weight Distribution (MWD). This polymer is made by degradation, usually peroxide-assisted, of regular PP reactor grades. However, in the most of applications (except for fibres), where polymers are stretched above their melting temperatures, CRPP is not able to deliver a desirable processing performance. It seems that for achieving an improved balance of processability of polymer melt and the final properties of the polymer in the solid state, an introducing of long chain branches on linear polymeric backbone is a better solution. Up to date, polypropylene branching is limited to post-reactor modification.

Existing post-reactor technologies for production of HMS polypropylene fall into two major categories:
a) high energy irradiation with or without functional monomers/oligomers as e.g. described in U.S. Pat. No. 4,916,198, U.S. Pat. No. 5,554,668 and US-A-2006/0,128,824;
b) reactive processing in the molten or solid states involving peroxides and/or functional monomers/oligomers as e.g. described in U.S. Pat. No. 5,416,169, U.S. Pat. No. 6,951,904, US-A-2007/0,004,861.

High energy radiation process implies (relies on) the use of electron-beam accelerators or gamma-ray generators and requires expensive means for radiation control and protection. In the course of the irradiation, some polymer degradation cannot be prevented; the irradiated grades often have an impaired colour and reduced extensibility of the melt.

Peroxide assisted reactive processing in the molten or solid states requires thorough peroxides de-activation afterwards. Unavoidably, small peroxide residues still remain in the polymer after the de-activation and may react with some co-additives and/or colorants, which might be introduced in the formulation in further processing steps. It is also known, that the final morphologies of reactively processed polymers are not stable, which, in turn, affects properties of the final articles.

In more detail, the present invention relates to a composition comprising the Components
(A) at least one linear olefin polymer;
(B) 0.05 to 2%, preferably 0.1 to 1%, relative to the weight of Component (A), of at least one photoinitiator; and
(C) 0.05 to 5%, preferably 0.5 to 2%, relative to the weight of Component (A), of at least one co-additive containing one or more double bonds.

Examples of Component (A) are
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene, for example high density polyethylene (HDPE), high density and high molecular weight polyethylene (HDPE-HMW), high density and ultrahigh molecular weight polyethylene (HDPE-UHMW), medium density polyethylene (MDPE), linear low density polyethylene (LLDPE).

Polyolefins, i.e. the polymers of monoolefins exemplified in the preceding paragraph, preferably polyethylene and polypropylene, can be prepared by different, and especially by the following, methods:

catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table.

The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example HDPE/LDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LLDPE/EVA, LLDPE/EAA and alternating or random poly-alkylene/carbon monoxide copolymers and mixtures thereof with other polymers, for example polyamides.

Homopolymers and copolymers from 1.)-3.) may have any stereostructure including syndiotactic, isotactic, hemi-isotactic or atactic; where isotactic polymers are preferred. Stereoblock polymers are also included.

According to a preferred embodiment Component (A) is at least one linear olefin polymer selected from the group consisting of a polyethylene homopolymer, a polypropylene homopolymer, a polyethylene copolymer and a polypropylene copolymer.

Component (A) may also be a blend of e.g. two linear olefin polymers (such as e.g. a blend of polypropylene homopolymer and polypropylene random copolymer) in a weight ratio of e.g. 20:1 to 1:20.

The photoinitiators (present Component (B)) may be any of benzoin and benzoin ether derivatives; benzyl ketal derivatives; α,α-dialkyloxyacetophenone derivatives; α-aminoalkyphenone derivatives; α-hydroxyalkylphenone derivatives; α-sulphonylalkylphenones, mono- or bis acylphosphine oxides; acylphosphine sulfides; phenylglyoxylate derivatives; O-acyl-2-oximino ketone derivatives; benzophenone and its derivatives; Michler's ketone and its derivatives; thioxanthone and its derivatives; camphorquinone, anthraquinone and its derivatives; 2-ketocoumarine and its derivatives; trihalomethyltriazine derivatives, especially trichloromethyl triazine derivatives; α-bromoketone derivatives; mixtures of all before mentioned compounds; and all the polymer-bond compounds of the type mentioned above.

The preferred photoinitiators have to be able to subtract liable hydrogen atoms from linear olefin polymers (present Component (A)) and/or co-additives containing one or more double bonds (present Component (C)) and, preferably, in addition, provide free radicals required for initiation of radical reactions.

In one preferred embodiment, the photoinitiator is a bifunctional unimolecular photoinitiator capable of hydrogen abstraction and of cleavage into free radicals. Examples of such photoinitiators are compounds of the phenylglyoxylate type as e.g. described in WO-A-2004/108,799, WO-A-08/040,650 and U.S. Pat. No. 6,048,660. The following two compounds are of interest:

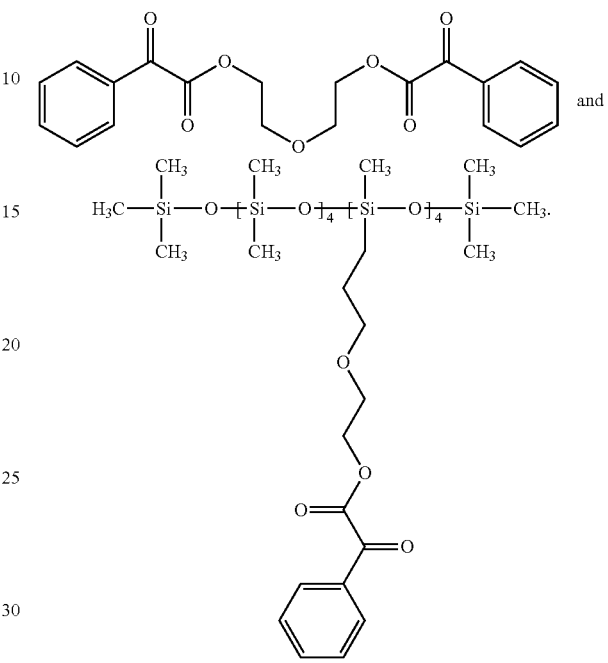

In another preferred embodiment, the photoinitiator is a mixture of one or more photoinitiators undergoing α-cleavage and one or more photoinitiators belonging to the group of bimolecular hydrogen abstractors. An example of such a system is a mixture of a benzophenone and a monoacylphosphine oxide (MAPO) and/or a bisacylphosphine oxide (BAPO).

Examples of MAPO are 2,4,6-trimethylbenzoyl-diphenylphosphine oxide, 2,4,6-trimethylbenzoyl-phenylphosphinic acid ethyl ester, (2,4,6-trimethylbenzoy)l-(2'-hydroxybiphenyl-2-yl) phosphinic acid potassium salt and a copolymer of 4-acryloyloxy-2,6-dimethylbenzoyl-diphenylphosphine oxide and n-butylacrylate.

Examples of BAPO are bis(2,6-dimethoxybenzoyl)-2,4,4-trimethylpentylphosphine oxide, bis(2,4,6-trimethylbenzoyl)-phenylphosphine oxide and 1,10-bis[bis(2,4,6-trimethylbenzoyl-diphenylphosphine oxide]-decane.

The use of bis(2,4,6-trimethylbenzoyl)-phenylphosphine oxide of the formula

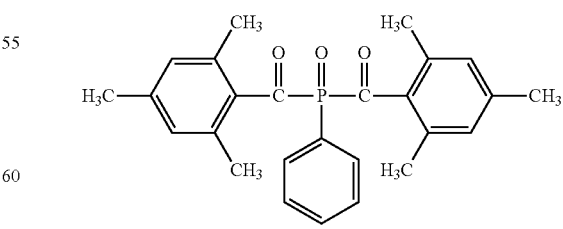

which is commercially available as IRGACURE 819 ®, optionally in combination with a substituted or unsubstituted benzophenone is preferred. A particularly preferred benzophenone is 4-dodecylbenzoylbenzene of the formula

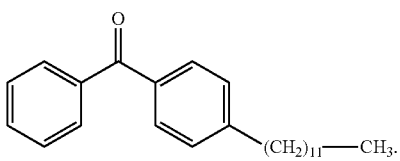

Further suitable examples of the benzophenone type are disclosed in e.g. in US-A-2004/033,317.

Blends of benzophenone and BAPO show a synergistic melt strength increase. An excess of benzophenone results in the rapid gain of melt stiffness, whereas an excess of acylphosphine oxide derivatives leads to the build-up in both, melt stiffness and extensibility. An increase in melt extensibility alone happening without any significant change in melt stiffness is also possible.

The ratio between benzophenone and BAPO varies depending on the intended application and may be for example 1:10 to 10:1. An advantageous "stiffness/extensibility" balance of the final olefin polymer resin is achieved when benzophenone to BAPO ratio is e.g. 1:1 to 1:5.

In another preferred embodiment, the photoinitiator is any type of bimolecular hydrogen abstractor such as benzophenone, Michler's ketone, thioxanthone or a mixture thereof.

The following general list indicates suitable photoinitiators:
camphor quinone; benzophenone, benzophenone derivatives, such as 2,4,6-trimethylbenzophenone, 2-methylbenzophenone, 3-methylbenzophenone, 4-methylbenzophenone, 2-methoxycarbonylbenzophenone 4,4'-bis(chloromethyl) benzophenone, 4-chlorobenzophenone, 4-phenylbenzophenone, 3,3'-dimethyl-4-methoxy-benzophenone, [4-(4-methylphenylthio)phenyl]-phenylmethanone, methyl-2-benzoylbenzoate, 3-methyl-4'-phenylbenzophenone, 2,4,6-trimethyl-4'-phenylbenzophenone, 4,4'-bis(dimethylamino)-benzophenone, 4,4'-bis(diethylamino)benzophenone; ketal compounds, as for example benzildimethylketal; acetophenone, acetophenone derivatives, for example α-hydroxycycloalkyl phenyl ketones or α-hydroxyalkyl phenyl ketones, such as for example 2-hydroxy-2-methyl-1-phenyl-propanone, 1-hydroxy-cyclohexyl-phenyl-ketone, 1-(4-dodecylbenzoyl)-1-hydroxy-1-methyl-ethane, 1-(4-isopropylbenzoyl)-1-hydroxy-1-methyl-ethane, 1-[4-(2-hydroxyethoxy)-phenyl]-2-hydroxy-2-methyl-1-propan-1-one; 2-hydroxy-1-{4-[4-(2-hydroxy-2-methyl-propionyl)-benzyl]-phenyl}-2-methyl-propan-1-one; 2-hydroxy-1-{4-[4-(2-hydroxy-2-methyl-propionyl)-phenoxy]-phenyl}-2-methyl-propan-1-one; dialkoxyacetophenones, α-hydroxy- or α-aminoacetophenones, e.g. (4-methylthiobenzoyl)-1-methyl-1-morpholinoethane, (4-morpholinobenzoyl)-1-benzyl-1-dimethylaminopropane, (4-morpholinobenzoyl)-1-(4-methylbenzyl)-1-dimethylaminopropane, (4-(2-hydroxyethyl)aminobenzoyl)-1-benzyl-1-dimethylaminopropane), (3,4-dimethoxybenzoyl)-1-benzyl-1-dimethylaminopropane; 4-aroyl-1,3-dioxolanes, benzoin alkyl ethers and benzil ketals, e.g. dimethyl benzil ketal, phenylglyoxalic esters and derivatives thereof, e.g. oxo-phenyl-acetic acid 2-(2-hydroxy-ethoxy)-ethyl ester, dimeric phenylglyoxalic esters, e.g. oxo-phenyl-acetic acid 1-methyl-2-[2-(2-oxo-2-phenyl-acetoxy)-propoxy]-ethyl ester; oximeesters, e.g. 1,2-octanedione 1-[4-(phenylthio)phenyl]-2-(O-benzoyloxime), ethanone 1-[9-ethyl-6-(2-methylbenzoyl)-9H-carbazol-3-yl]-1-(O-acetyloxime), 9H-thioxanthene-2-carboxaldehyde 9-oxo-2-(O-acetyloxime), peresters, e.g. benzophenone tetracarboxylic peresters as described for example in EP-A-126,541, monoacyl phosphine oxides, e.g. (2,4,6-trimethylbenzoyl)diphenylphosphine oxide, ethyl (2,4,6 trimethylbenzoyl phenyl) phosphinic acid ester; bisacylphosphine oxides, e.g. bis(2,6-dimethoxy-benzoyl)-(2,4,4-trimethyl-pentyl)phosphine oxide, bis(2,4,6-trimethylbenzoyl)-phenylphosphine oxide, bis(2,4,6-trimethylbenzoyl)-2,4-dipentoxyphenylphosphine oxide, trisacylphosphine oxides, halomethyltriazines, e.g. 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine, hexaarylbisimidazole/coinitiators systems, e.g. ortho-chlorohexaphenyl-bisimidazole combined with 2-mercaptobenzthiazole, ferrocenium compounds, or titanocenes, e.g. bis(cyclopentadienyl)-bis(2,6-difluoro-3-pyrryl-phenyl)titanium.

According to a preferred embodiment of the present invention Component (B) is at least one photoinitiator selected from the group consisting of phenylglyoxylate derivatives, acylphosphine oxide derivatives and benzophenone derivatives; in particular the phenylglyoxylate derivative of the formula

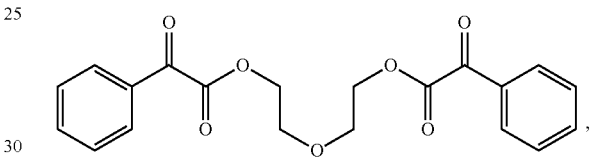

the phenylglyoxylate derivative of the formula

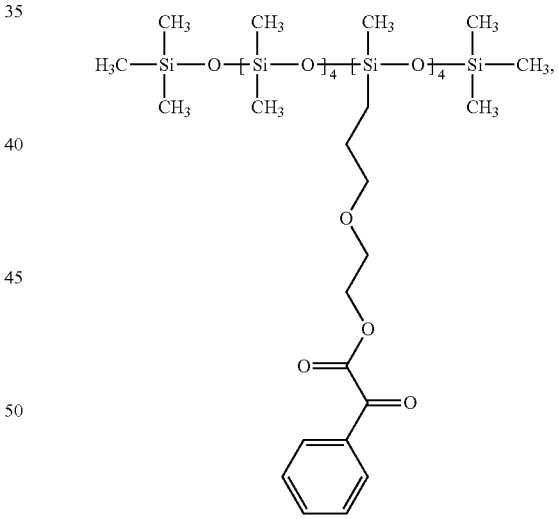

bis[2,4,6-trimethylbenzoyl]-phenylphosphineoxide and 4-dodecylbenzoylbenzene.

The photoinitiators suitable as present Component (B) are known and can be prepared in analogy to known methods; some are commercially available.

Surprisingly, it has been found that the presence of a co-additive containing one or more double bonds (Component (C)) allows to shift the balance between degradation and molecular weight build-up reactions of linear olefin polymers towards recombination and, thus, towards desired polyolefin branching, which is eventually reflected in a melt strength increase.

Examples of suitable co-additives containing one or more double bonds, preferably 2 to 4 double bonds, in particular 3 double bonds, are ethene derivatives, propene derivatives, acrylic acid derivatives, methacrylic acid derivatives and diene derivatives as well as appropriate mixtures thereof. Examples of co-additives include in particular diacrylates of ethylene glycol, propylene glycol, neopentyl glycol, hexamethylene glycol or bisphenol-A, or the corresponding dimethacrylates; trimethylolpropane triacrylate, trimethylolpropane trimethacrylate, pentaerythritol triacrylate or the corresponding tetraacrylate; 4,4'-bis(2-acryloyloxyethoxy) diphenylpropane, vinyl acrylate, divinyl benzene, triallylcyanurate, triallylisocyanurate, diallyl bisphenol-A as well as olefinic hydrocarbons such as 1,7-octadiene, 1,9-decadiene and trivinylcyclohexane (TVCH).

Triallylcyanurate of the formula

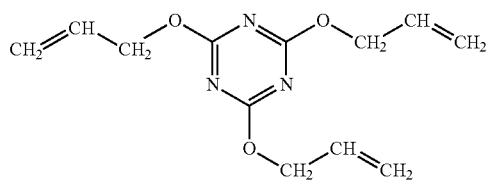 [SMILES: C=CCOc1nc(OCC=C)nc(OCC=C)n1]

and
trimethylolpropane trimethacrylate of the formula

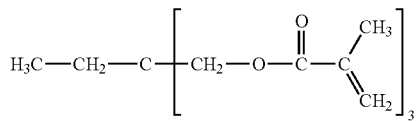

are particularly preferred.

The compositions or the final olefin polymer resins according to the present invention may also contain e.g. 0.001 to 10%, preferably 0.01 to 5%, relative to the weight of Component (A), of at least one conventional additive, in particular a stabilizer for protection against degradation during mixing, compounding, any further processing and the intended end use application.

The conventional additives may be added before and/or after irradiation.

Examples of suitable conventional additives are listed below.
1. Antioxidants
  1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.
  1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
  1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.
  1.4. Tocopherols, for example α-tocopherol, β-tocopherol, γ-tocopherol, δ-tocopherol and mixtures thereof (vitamin E).
  1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.
  1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.
  1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.
  1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.
  1.9. Aromatic hydroxybenzyl compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
  1.10. Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenyl-amines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. Light Stabilizers

Sterically hindered amines, for example: carbonic acid bis(1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethyl-piperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylene-diamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro-[4,5]decane, a reaction product of 7,7,9,9-tetramethyl-2-cyclounaecyl-1-oxa-3,8-diaza-4-oxo-spiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba Specialty Chemicals Inc.), tris(nonylphenyl) phosphite,

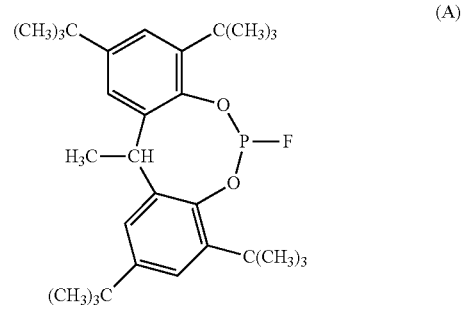

(A)

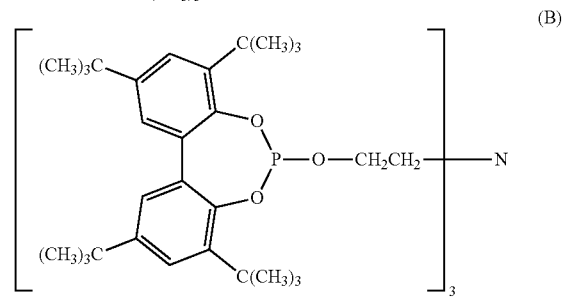

(B)

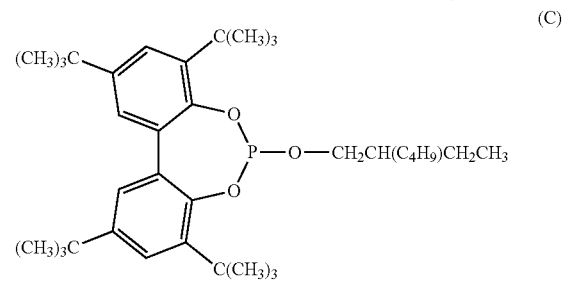

(C)

(D)

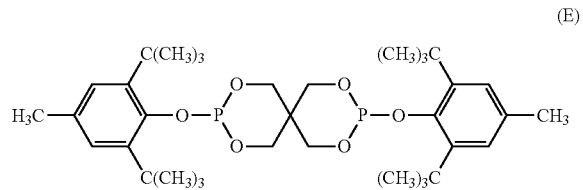

(E)

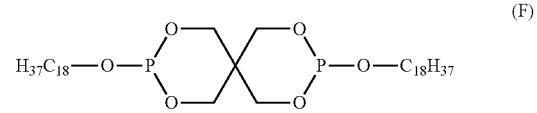

(F)

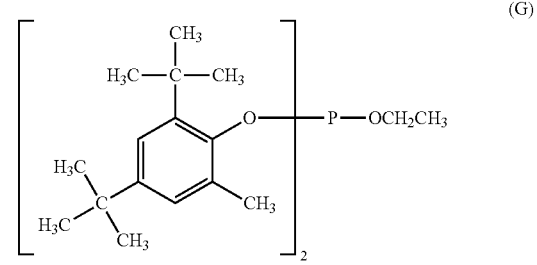

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrone derived from N,N-dialkylhydroxyl-amine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

11. Fillers and reinforcing agents, for example calcium carbonate, silicates, glass fibres, glass beads, asbestos, talc, kaolin, mica, barium sulfate, metal oxides and hydroxides, wood flour and flours or fibers of other natural products, synthetic fibers.

12. Other additives, for example plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxy-ethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctyl-benzofuran-2-one.

According to a further preferred embodiment of the present invention, the modified olefin polymer contains one or more of the following conventional additives:
Processing aids, nucleating agents, antistatic agents, flame retardants, chemical blowing agents, colorants, pigments, fillers and combinations thereof.

Particularly preferred conventional additives are phosphites or phosphonites as e.g. defined under item 4 above, antioxidants as e.g. defined under items 1.1 to 1.19 above, in particular phenolic antioxidants, and 2,2,6,6-tetramethylpiperidine derivatives as e.g. defined under item 2 above.

In general, the conventional additives can be added to the olefin polymer before or after modification at any stage.

The invention also includes all moulded or extruded articles containing the olefin polymer modified according to the invention.

Another embodiment of the present invention is a process for preparing a modified olefin polymer resin, which comprises
preparing a solid polymer article made of a composition containing the Components (A), (B) and (C) as defined above, and having a thickness of equal or less than 3 mm, preferably 10 µm to 3 mm, in particular 100 µm to 2 mm;
exposing the polymer article to light of 200 to 800 nm, preferably 200 to 600 nm, at a radiation doze of 0.5 to 10 J/cm$^2$ and at a temperature below the melting temperature of the initial polymer article.

The polymer article of the above process is preferably in pellet form.

Components (A), (B) and (C) are preferably compounded in a single or twin screw extruder at a temperature of 170 to 250° C. and under inert gas.

The use of a Gallium-doped gas discharge lamp is preferred for the light exposure.

The radiation doze is preferably 0.5 to 10 J/cm$^2$ and the distance of the lamp to the article to be irradiated is conveniently 5 to 150 cm.

The exposure is preferable done at room temperature, e.g. 20° to 25° C.

The exposure may be carried out in the air atmosphere.

A further embodiment of the present invention relates to an UV irradiated composition comprising the Components
(A) at least one linear olefin polymer;
(B) 0.05 to 2%, relative to the weight of Component (A), of at least one photoinitiator; and
(C) 0.05 to 5%, relative to the weight of Component (A), of at least one co-additive containing one or more double bonds; characterized in an improvement of the Stretching Force at melt break $F_{break}$ of at least 15% and/or an improvement of the corresponding drawn down Velocity $v_{break}$ of at least 15%, relative to $F_{break}$ and/or $v_{break}$ of the non UV irradiated composition.

The improvement of $F_{break}$ is preferably 15 to 150%, for example 15 to 95%, in particular 30 to 95% or 40 to 95%, relative to $F_{break}$ of the non UV irradiated composition.

The improvement of $v_{break}$ is preferably 15 to 100%, for example 18 to 45%, in particular 20 to 45%, relative to $v_{break}$ of the non UV irradiated composition.

Another preferred embodiment of the present invention relates to an UV irradiated composition comprising the Components
(A) at least one linear olefin polymer;
(B) 0.05 to 2%, relative to the weight of Component (A), of at least one photoinitiator; and (C) 0.05 to 5%, relative to the weight of Component (A), of at least one co-additive containing one or more double bonds; characterized in an improvement of the Stretching Force at melt break $F_{break}$ of at least 15% and/or an improvement of the corresponding drawn down Velocity $v_{break}$ of at least 15%, relative to $F_{break}$ and/or $v_{break}$ of Component (A).

The improvement of $F_{break}$ is preferably 15 to 150%, for example 15 to 95%, in particular 30 to 95% or 40 to 95%, relative to $F_{break}$ of Component (A).

The improvement of $v_{break}$ is preferably 15 to 100%, for example 18 to 45%, in particular 20 to 45%, relative to $v_{break}$ of Component (A).

The examples below illustrate the invention in greater detail. All percentages and parts are by weight, unless stated otherwise.

Materials Used:

The polypropylene copolymer used in the following examples is Polypropylene Random Copolymer with Ethylene RB501BF (MFR=1.9 g/10 min according to ISO 1133/ASTM D1238 (230° C./2.16 kg), available from Borealis).

The linear low density polyethylene used in the following examples is Linear Low Density Polyethylene LL4004EL (MFR=3.6 g/10 min according to ISO 1133/ASTM D1238 (190° C./2.16 kg), available from ExxonMobil).

The polypropylene homopolymer used in the following examples is Polypropylene Homopolymer A 10 TB (MFR=3 g/10 min according to ISO 1133/ASTM D1238 (230° C./2.16 kg) available from Polychim Industries).

EXAMPLE 1

Pellets Preparation

Polypropylene random copolymer is pre-mixed in a Henschel FM/A10 high speed mixer with 0.25% of bis[2,4,6-trimethylbenzoyl]-phenylphosphineoxide, 0.25% of 4-dodecylbenzoyl-benzene and 1% of triallylcyanurate and compounded in a Berstorff ZE 25×32D twin screw extruder under nitrogen (flow rate: 25 ml/min). The barrel temperature is 180° C. for all zones and the measured melt temperature is 185° C. A standard type of screw is used; the screw speed and the feeding rate are 180 revolutions per minutes (RPM) and 6 kg/hour, respectively. A single extruded stand is cooled by passing through a water bath and cut into pellets using a PRIMO 60E type of granulator from Rieter Automatik.

The resulted pellets have a cylindrical shape with the following average dimensions:
the smaller diameter of the base oval is 1.8 mm, the larger diameter is 2.5 mm and the height of the cylinder is 1.8 mm.

From mixing until the UV-exposure, the material is kept either in black bags or/and in the closed cardboard containers to avoid premature (de)activation of the photoinitiators.

UV-Exposure Procedure:

The UV-exposure is done with a statutory Gallium-doped ("G"-type; gas discharge lamp UVASPOT 400/T; Dr. Hönle AG). UVASPOT lamps are specially designed for the large area exposures. Approximately 60 grams of pellets prepared as described above are placed into a shallow container of size 23 cm×30 cm×2 cm made of polished stainless steel and positioned directly under the lamp on the supporting plane parallel to the lamp bulb within 30 cm distance. Four different exposure times of 1, 2, 3 and 4 minutes are used.

Test Procedures:

Melt Flow Rate (MFR) measurements are done with Göttfert MF300 tester in accordance with ISO 1133/ASTM D1238 (230° C./2.16 kg).

Melt Strength measurements are conducted at 200° C. using a Goettfert Rheotens tester, model 71.97 and a Goettfert single screw extruder running at 0.35 kg/hour output. In the test, an extruded through a 30/2 mm die strand of polymer is drawn vertically 100 mm downwards into the nip between two counter-rotating rollers, rotating with a constant acceleration rate of 5 mm/s². Because of the acceleration, velocity (v, mm/s) of the strand drawing continually increases, which, in turn, is reflected in the increase in the drawing force (F, cN), measured and plotted as F=f(v) curves by the Rheotens software. At the certain drawing (down) velocity, the resisting force in the strand reaches the maximum polymer allows, and a draw resonance, followed by the strand breakage, occurs. We define the Force at the melt break, $F_{break}$, commonly referred as Melt Strength, and the corresponding draw down velocity, $v_{break}$, as Y and X coordinates corresponding to the onset of the draw resonance on the plotted by Goettfert software Force curves.

Melt strength measurements are analogously described in US-A-2007/0004861, paragraphs [65] and [0070].

The results from MFR and Melt Strength measurements are summarized in Table 1 below.

TABLE 1

Effect of exposure time on polypropylene random copolymer modified with 0.25% of bis[2,4,6-trimethylbenzoyl]-phenylphosphineoxide, 0.25% of 4-dodecylbenzoyl-benzene and 1% of triallylcyanurate.

| | Exposure time in min | | | | |
|---|---|---|---|---|---|
| Parameter | 0 | 1 | 2 | 3 | 4 |
| MFR, [g/10 min] | 2.4 | 2.2 | 1.75 | 1.2 | 0.9 |
| $F_{break}$, [cN] | 7.6 | 7.7 | 9.3 | 11.3 | 12.4 |
| $v_{break}$, [mm/s] | 320 | 300 | 345 | 400 | 325 |

Example 1 illustrates an increase in $F_{break}$ correlating with the melt stiffness with an increase in the exposure time/radiation doze. The observed increase in $F_{break}$ is mirrored by a decrease in MFR values. Furthermore, the example demonstrates that there is a certain radiation doze until which $F_{break}$ and $v_{break}$ (corresponding to the melt extensibility) raise in parallel. After this doze is exceeded, the melt stiffness increases at the expense of melt extensibility.

EXAMPLE 2

Example 1 is repeated except that the loadings of bis[2,4,6-trimethylbenzoyl]-phenylphosphineoxide, 4-dodecylbenzoyl-benzene and triallylcyanurate are halved and the UV-exposure time is 2 and 4 minutes.

TABLE 2

Effect of exposure time on polypropylene random copolymer modified with 0.125% of bis[2,4,6-trimethylbenzoyl]-phenylphosphineoxide, 0.125% of 4-dodecylbenzoyl-benzene and 0.5% of triallylcyanurate.

| | Exposure time in min | | |
|---|---|---|---|
| Parameter | 0 | 2 | 4 |
| MFR, [g/10 min] | 2.2 | 2.4 | 2.3 |
| $F_{break}$, [cN] | 7.8 | 8.8 | 11.2 |
| $v_{break}$, [mm/s] | 300 | 330 | 410 |

Example 2 illustrates a surprising increase in $F_{break}$ and $v_{break}$ at the unchanged, as compared to initial, MFR values.

EXAMPLE 3

Foaming Application

Foaming:

40 g of polypropylene random copolymer unmodified or modified as described in Example 1, exposure time 4 min, are kneaded in the Brabender Plastogram PL 2000 with 2% of a chemical foaming agent (Hydrocerol PEX 5008, available from Clariant) for 10 min at 170° C. under nitrogen. After kneading, the polymers are pressed consecutively in two compression moulding machines, in the first, at 170° C. with 50 bar for 3 min, and, in the second, at 220° C. with 100 bar for another 3 min. Followed that, the pressure is rapidly released and gases, formed in the course of the Hydrocerol decomposition, foamed the samples.

Microscopy Characterization of Foams Made of Original and Modified Polypropylene Random Copolymer:

Appearance of the foamed samples in the cross-sectional plane is examined by an electron microscope ESEM™ FEI QUANTA 200. It is known that linear polymers are difficult to foam as their chains have a reduced ability to hold voids growing in the polymer matrix. In accordance with this, original polypropylene random copolymer is hardly foamed. The sample exhibits only a few holes formed in the result of the decomposition gases escape. Unlike the original polymer, the modified material demonstrates a "bubbled", that is, in the foaming jargon, a closed-cell structure been characteristic of the foamed high melt strength grades.

Foam Density Calculation:

Rectangular 44 mm×60 mm samples are cut out the foamed plaques. The thickness of the plaques is measured with a micrometer. The density, ρ, is calculated accordingly to ρ=m/V, where m is the mass and V is the volume of the samples been cut out. Results of the calculations are shown in Table 3 below.

TABLE 3

Effect of modification on foam density.

| N° | Polypropylene random copolymer | Density, [kg/m$^3$] |
|---|---|---|
| 3-1. | Unmodified | 800 |
| 3-2. | Modified according to Example 1 | 390 |

EXAMPLE 4

Example 1 and Example 2 are repeated except that instead of triallylcyanurate, trimethylolpropane trimethacrylate is used as the co-additive containing double bonds and the exposure time is 1 and 3 min. Results are summarized in Tables 4 and 5.

TABLE 4

Effect of exposure time on properties of polypropylene random copolymer modified with 0.25% of bis[2,4,6-trimethylbenzoyl]-phenylphosphineoxide, 0.25% of 4-dodecylbenzoyl-benzene and 1% of trimethylolpropane trimethacrylate.

| Parameter | Exposure time in min | | |
|---|---|---|---|
| | 0 | 1 | 3 |
| MFR, [g/10 min] | 2.2 | 0.9 | 0.7 |
| $F_{break}$, [cN] | 8.7 | 10.0 | 12.0 |
| $v_{break}$, [mm/s] | 330 | 370 | 210 |

TABLE 5

Effect of exposure time on properties of polypropylene random copolymer modified with 0.125% of bis[2,4,6-trimethylbenzoyl]-henylphosphineoxide, 0.125% of 4-dodecylbenzoyl-benzene and 0.5% of trimethylolpropane trimethacrylate.

| Parameter | Exposure time in min | | |
|---|---|---|---|
| | 0 | 1 | 3 |
| MFR, [g/10 min] | 2.1 | 1.4 | 1.3 |
| $F_{break}$, [cN] | 8.5 | 10.0 | 11.7 |
| $v_{break}$, [mm/s] | 310 | 340 | 380 |

Example 4 confirms the trends for $F_{break}$ and $v_{break}$ seen in Examples 1 and 2. It also shows that a methacrylic acid derivative (trimethylolpropane trimethacrylate) can be used as a co-additive instead of an ethane derivative (triallylcyanurate) and that the former is more effective than the latter as, at the same loadings, shorter exposure times are required for trimethylolpropane trimethacrylate containing formulations to reach the same values of $F_{break}$.

EXAMPLE 5

Example 1 is repeated except that instead of triallylcyanurate, trimethylolpropane trimethacrylate (TMPTMA) is used as the co-additive containing double bonds and instead of the combination of "bis[2,4,6-trimethylbenzoyl]-phenylphosphineoxide and 4-dodecylbenzoyl-benzene", a phenylglyoxylate derivative (PG) as indicated in Table 6 is used as the photoinitiator. The exposure time is 2 min. Results from the measurements are summarized in Table 6 below.

TABLE 6

Modifying effect of esters of phenylglyoxylate on polypropylene random copolymer after 2 min of UV-exposure.

| N° | Material/Formulation | MFI, [g/10 min] | $F_{break}$, [cN] | $v_{break}$, [mm/s] |
|---|---|---|---|---|
| 6-1. | Unmodified polypropylene random copolymer | 1.9 | 7.0 | 275 |
| 6-2. | Polypropylene random copolymer modified with 1% of TMPTMA | 2.0 | 6.7 | 260 |
| 6-3. | Polypropylene random copolymer modified with 0.5% of "PG 1" plus 1% of TMPTMA | 0.5 | 11.5 | 325 |
| 6-4. | Polypropylene random copolymer modified with 1% of "PG 2" plus 1% of TMPTMA | 0.4 | 13.4 | 400 |

PG 1:

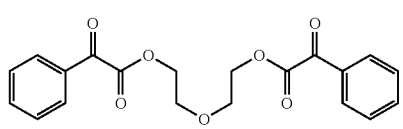 [SMILES: O=C(OCCOCCOC(=O)C(=O)c1ccccc1)C(=O)c1ccccc1]

TABLE 6-continued

Modifying effect of esters of phenylglyoxylate on polypropylene random copolymer after 2 min of UV-exposure.

| N° | Material/Formulation | MFI, [g/10 min] | $F_{break}$, [cN] | $v_{break}$, [mm/s] |
|---|---|---|---|---|

PG 2:

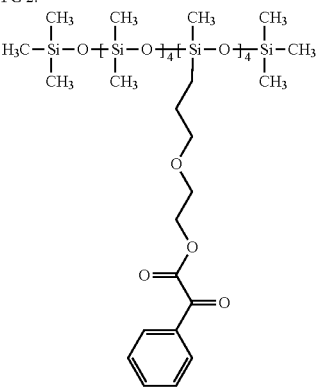

The results shown in Table 6 illustrate no real effect from TMPTMA alone on either measured parameter.

EXAMPLE 6

Pellets Preparation

Pellets of five formulations listed below are prepared and handled as described in Example 1, except that not polypropylene random copolymer but linear low density polyethylene is used as the base polymer and the screw speed is 100-120 revolutions per minutes (RPM).

UV-exposure is conducted as described in Example 1. The exposure time is 2 min.

Melt Flow Index (MFI) measurements are conducted in accordance with ISO 1133/ASTM D1238 (190° C./2.16 kg).

Melt Strength measurements are done as described in Example 1, except that the temperature of the melt is 150° C. and the acceleration rate of the Rheotens rollers is 15 mm/s².

TABLE 7

Influence of photoinitiator's concentration on melt properties of linear low density polyethylene (LLDPE) before and after UV-exposure for 2 min.

| N° | LLDPE containing | Exposure | MFI, [g/10 min] | $F_{break}$, [cN] | $v_{break}$, [mm/s] |
|---|---|---|---|---|---|
| | — | No | 4.1 | 5.3 | 525 |
| | — | Yes | 4.1 | 5.3 | 500 |
| | 1% of TMPTMA | No | 4.3 | 4.9 | 540 |
| | 1% of TMPTMA | Yes | 4.2 | 4.7 | 535 |
| 7-1a. | 0.25% of PI-1, 0.25% of BP and 1% of TMPTMA | No | 4.4 | 4.4 | 480 |
| 7-1b. | 0.25% of PI-1, 0.25% of BP and 1% of TMPTMA | Yes | 1.3 | 8.0 | 320 |
| 7-2a. | 0.125% of PI-1, 0.125% of BP and 0.5% of TMPTMA | No | 4.3 | 4.3 | 410 |
| 7-2b. | 0.125% of PI-1, 0.125% of BP and 0.5% of TMPTMA | Yes | 2.5 | 6.1 | 540 |

PI-1: Bis[2,4,6-trimethylbenzoyl]-phenylphosphineoxide
BP: 4-Dodecylbenzoyl-benzene
TMPTMA: Trimethylolpropanetrimethylacrylate Table 7 above illustrates a pronounced increase in $F_{break}$, correlating with the melt stiffness, at a higher loading of photoinitiators accompanied though by some decrease in the melt extensibility ($v_{break}$). At a lower loading, at the same radiation doze, a concurrent increase in both parameters is possible.

EXAMPLE 7

Example 1 is repeated without bis[2,4,6-trimethylbenzoyl]-phenylphosphineoxide and triallylcyanurate being optionally present. Results are summarized in Tables 8 and 9.

TABLE 8

Effect of exposure time on properties of Polypropylene random copolymer modified with 0.5% of 4-dodecylbenzoyl-benzene

| | Exposure time in min | | |
|---|---|---|---|
| Parameter | 0 | 2 | 4 |
| MFR, [g/10 min] | 1.9 | 4.1 | 5.7 |
| $F_{break}$, [cN] | 9.1 | 9.2 | 8.7 |
| $v_{break}$, [mm/s] | 320 | 350 | 330 |

TABLE 9

Effect of exposure time on properties of polypropylene random copolymer modified with 0.5% of 4-dodecylbenzoyl-benzene and 1.0% of triallylcyanurate.

| | Exposure time in min | | |
|---|---|---|---|
| Parameter | 0 | 2 | 4 |
| MFR, [g/10 min] | 2.2 | 3.5 | 2.3 |
| $F_{break}$, [cN] | 8.8 | 10.9 | 13.7 |
| $v_{break}$, [mm/s] | 320 | 425 | 180 |

The above results show, that upon UV-exposure, 4-dodecylbenzoyl-benzene alone (Table 8) leads to the degradation of the matrix polymer which is reflected in the 3-fold increase of MFR after 4 min of exposure. On the other hand, a combination of 4-dodecylbenzoyl-benzene and triallylcyanurate (Table 9) gives a positive trend, already seen in the Examples 1-6.

EXAMPLE 8

Example 1 is repeated except that the ratio of loadings of bis[2,4,6-trimethylbenzoyl]-phenylphosphineoxide and 4-dodecylbenzoyl-benzene is varied.

TABLE 10

Effect of exposure time on properties of polypropylene random copolymer modified with 0.25% of bis[2,4,6-trimethylbenzoyl]-phenylphosphineoxide, 0.5% of 4-dodecylbenzoyl-benzene and 1% of triallylcyanurate.

|  | Exposure time in min | | |
|---|---|---|---|
| Parameter | 0 | 2 | 4 |
| MFR, [g/10 min] | 2.5 | 1.9 | 1.0 |
| $F_{break}$, [cN] | 8.2 | 10.4 | 13.5 |
| $V_{break}$, [mm/s] | 330 | 395 | 210 |

TABLE 11

Effect of exposure time on properties of polypropylene random copolymer modified with 0.25% of bis[2,4,6-trimethylbenzoyl]-phenylphosphineoxide, 0.125% of 4-dodecylbenzoyl-benzene and 1% of triallylcyanurate.

|  | Exposure time in min | | |
|---|---|---|---|
| Parameter | 0 | 2 | 4 |
| MFR, [g/10 min] | 2.5 | 1.8 | 1.0 |
| $F_{break}$, [cN] | 8.1 | 9.4 | 11.9 |
| $V_{break}$, [mm/s] | 340 | 350 | 440 |

TABLE 12

Effect of exposure time on properties of polypropylene random copolymer modified with 0.1% of bis[2,4,6-trimethylbenzoyl]-phenylphosphineoxide, 0.5% of 4-dodecylbenzoyl-benzene and 1% of triallylcyanurate.

|  | Exposure time in min | | |
|---|---|---|---|
| Parameter | 0 | 2 | 4 |
| MFR, [g/10 min] | 2.3 | 2.5 | 1.4 |
| $F_{break}$, [cN] | 8.2 | 10.9 | 13.5 |
| $V_{break}$, [mm/s] | 335 | 395 | 175 |

The above results show that an excess of 4-dodecylbenzoyl-benzene over bis[2,4,6-trimethylbenzoyl]-phenylphosphineoxide (Tables 10 and 12), when compared with 1:1 ratio of these photoinitiators (Table 1, Example 1), would result in a more rapid increase in the melt stiffness, meaning that shorter exposure times can be employed to achieve the same value of $F_{break}$. On the over hand, through using an excess of bis[2,4,6-trimethylbenzoyl]-phenylphosphineoxide (Table 11), a better overall balance of melt stiffness and extensibility is possible if the sufficient exposure time is allowed.

EXAMPLE 9

Example 1 is repeated except that polypropylene homopolymer is used as the initial material for modification. Compounding is done at 200-210° C. The screw speed and the feeding rate are 150 revolutions per minutes (RPM) and 8 kg/hour, respectively. Melt strength measurements are conducted at 220° C. The results are summarized in the Table 13 below along with the MFR results.

TABLE 13

Effect of exposure time on properties of polypropylene homopolymer modified with 0.25% of bis[2,4,6-trimethylbenzoyl]-phenylphosphineoxide, 0.25% of 4-dodecylbenzoyl-benzene and 1% of triallylcyanurate.

|  | Exposure time in min | | |
|---|---|---|---|
| Parameter | 0 | 2 | 4 |
| MFR, [g/10 min] | 4.2 | 2.9 | 1.6 |
| $F_{break}$, [cN] | 5.4 | 6.7 | 8.1 |
| $V_{break}$, [mm/s] | 350 | 390 | 480 |

The above results show that the photoinitiators/UV-exposure modification, apparent in the increase of melt stiffness ($F_{break}$) and extensibility ($v_{break}$), works for polypropylene homopolymer as well.

EXAMPLE 10

Example 9 is repeated except that a 1:1 blend of polypropylene homopolymer and polypropylene random copolymer is used as the initial material for modification. Table 14 below summarizes the results.

TABLE 14

Effect of exposure time on properties of a 1:1 blend of polypropylene homopolymer and polypropylene random copolymer modified with 0.25% of bis[2,4,6-trimethylbenzoyl]-phenylphosphineoxide, 0.25% of 4-dodecylbenzoyl-benzene and 1% of triallylcyanurate.

|  | Exposure time in min | | |
|---|---|---|---|
| Parameter | 0 | 2 | 4 |
| MFR, [g/10 min] | 3.3 | 2.5 | 1.3 |
| $F_{break}$, [cN] | 6.3 | 7.4 | 9.1 |
| $V_{break}$, [mm/s] | 370 | 430 | 500 |

The above results show that blends of homopolymer and copolymer of polypropylene can be modified in a similar way as their components.

EXAMPLE 11

Polypropylene copolymer is pre-mixed in a Henschel FM/A10 high speed mixer with 0.25% of bis[2,4,6-trimethylbenzoyl]-phenylphosphineoxide, 0.25% of 4-dodecylbenzoyl-benzene, 1% of triallylcyanurate and 0.25% (one of each) HALS-1, HALS-2 or HALS-3. Pellets of these formulations are prepared and exposed as described in Example 1, exposure time being 4 min.

Melt Flow Rate (MFR) measurements are conducted in accordance with ISO 1133/ASTM D1238 (230° C./2.16 kg) and are summarized in Table 15.

TABLE 15

Effect of the presence of HALS-1, HALS-2 or HALS-3 on MFR of polypropylene copolymer modified with 0.25% of bis[2,4,6-trimethylbenzoyl]-phenylphosphineoxide, 0.25% of 4-dodecylbenzoyl-benzene and 1% of triallylcyanurate before and after UV-light exposure.

| N° | Formulation | Exposure | MFR, [g/10 min] |
|---|---|---|---|
| 15-1a. | 0.25% of PI-1, 0.25% of BP, 1% of TAC + 0.25% of HALS-1 | No | 2.9 |
| 15-1b. | 0.25% of PI-1, 0.25% of BP, 1% of TAC + 0.25% of HALS-1 | Yes | 0.8 |
| 15-2a. | 0.25% of PI-1, 0.25% of BP, 1% of TAC + 0.25% of HALS-2 | No | 2.8 |

TABLE 15-continued

Effect of the presence of HALS-1, HALS-2 or HALS-3 on MFR of polypropylene copolymer modified with 0.25% of bis[2,4,6-trimethylbenzoyl]-phenylphosphineoxide, 0.25% of 4-dodecylbenzoyl-benzene and 1% of triallylcyanurate before and after UV-light exposure.

| N° | Formulation | Exposure | MFR, [g/10 min] |
|---|---|---|---|
| 15-2b. | 0.25% of PI-1, 0.25% of BP, 1% of TAC + 0.25% of HALS-2 | Yes | 0.9 |
| 15-3a. | 0.25% of PI-1, 0.25% of BP, 1% of TAC + 0.25% of HALS-3 | No | 3.5 |
| 15-3b. | 0.25% of PI-1, 0.25% of BP, 1% of TAC + 0.25% of HALS-3 | Yes | 1.0 |

Table 15 illustrates that HALS-1, HALS-2 or HALS-3 does not interfere with modification reactions initiated by UV-light.

One millimeter-thick sheets are pressed out of exposed pellets using a Suter LP 322 compression molding machine operated at 200° C. Artificial weathering is performed on the compression molded samples in the xenon arc weather-ometer Ci65A according to ASTM G26 C. The Yellowness Index (YI), according to ASTM D 1925, and the colour difference, as compared 0 hrs value ($\Delta E$), according ASTM D 2244, are measured using a Spectraflash SF 600 Plus instrument after (0), 1000, 2000 and 3000 hours of weathering. The results are reported in Table 16.

TABLE 16

Weathering resistance of compression molded samples of UV irradiated polypropylene copolymer modified with 0.25% of bis[2,4,6-trimethylbenzoyl]-phenylphosphineoxide, 0.25% of 4-dodecylbenzoyl-benzene, 1% of triallylcyanurate and 0.25% HALS-1, HALS-2 or HALS-3

| | | YI after | | | | $\Delta E$ after | | |
|---|---|---|---|---|---|---|---|---|
| N° | Formulation | 0 hrs | 1000 hrs | 2000 hrs | 3000 hrs | 1000 hrs | 2000 hrs | 3000 hrs |
| 16-1. | 0.25% of PI-1, 0.25% of BP, 1% of TAC + 0.25% of HALS-1 | 4.3 | 4.4 | 4.2 | 3.8 | 0.5 | 0.5 | 0.6 |
| 16-2. | 0.25% of PI-1, 0.25% of BP, 1% of TAC + 0.25% of HALS-2 | 4.3 | 3.8 | 3.6 | 3.6 | 0.6 | 0.6 | 0.7 |
| 16-3. | 0.25% of PI-1, 0.25% of BP, 1% of TAC + 0.25% of HALS-3 | 5.0 | 4.8 | 5.0 | 4.9 | 0.3 | 0.3 | 0.5 |

TABLE 15-continued

Effect of the presence of HALS-1, HALS-2 or HALS-3 on MFR of polypropylene copolymer modified with 0.25% of bis[2,4,6-trimethylbenzoyl]-phenylphosphineoxide, 0.25% of 4-dodecylbenzoyl-benzene and 1% of triallylcyanurate before and after UV-light exposure.

| N° | Formulation | Exposure | MFR, [g/10 min] |
|---|---|---|---|

PI-1:
Bis[2,4,6-trimethylbenzoyl]-phenylphosphineoxide
BP:
4-Dodecylbenzoyl-benzene
TAC:
Triallylcyanurate
HALS-1:
(TINUVIN 770 (RTM))

[Chemical structure of HALS-1: piperidine rings with N-H groups connected by -O-C(=O)-(CH₂)₈-C(=O)-O- linker, with H₃C groups on piperidine rings]

HALS-2:
(TINUVIN 765 (RTM))

[Chemical structure of HALS-2: piperidine rings with N-CH₃ groups connected by -O-C(=O)-(CH₂)₈-C(=O)-O- linker]

HALS-3:
(TINUVIN 123 (RTM))

[Chemical structure of HALS-3: piperidine rings with N-O-C₈H₁₇-n groups connected by -O-C(=O)-(CH₂)₈-C(=O)-O- linker]

Table 16 illustrates that the light stability of polypropylene copolymer modified with 0.25% of bis[2,4,6-trimethylbenzoyl]-phenylphosphineoxide, 0.25% of 4-dodecylbenzoyl-benzene, 1% of triallylcyanurate and 0.25% HALS-1, HALS-2 or HALS-3 is excellent.

EXAMPLE 12

The procedure of Example 1 is repeated with fixed loadings of 0.25% of bis[2,4,6-trimethylbenzoyl]-phenylphosphineoxide and 0.125% of 4-dodecylbenzoyl-benzene in the presence of the co-additives 1% of TAC, 1% of TMPTMA or the blend 0.5% of TAC and 0.5% of TMPTMA, respectively. The exposure time is 4 min. Results from the measurements are summarized in Tables 17 and 18.

Co-Additives:
TAC: Triallylcyanurate
TMPTMA: Trimethylolpropanetrimethylacrylate

TABLE 17

Effect of the co-additives composition on properties of polypropylene random copolymer modified with 0.25% of bis[2,4,6-trimethylbenzoyl]-phenylphosphineoxide and 0.125% of 4-dodecylbenzoyl-benzene after 4 min of UV-exposure.

| N° | Material/Formulation | MFR, [g/10 min] | $F_{break}$ [cN] |
|---|---|---|---|
| 17-0. | Unmodified polypropylene random copolymer | 1.9 | 7.0 |
| 17-1. | Modified polypropylene random copolymer containing 1% of TAC | 1.0 | 11.9 |
| 17-2. | Modified polypropylene random copolymer containing 1% of TMPTMA | 0.7 | 12.3 |

TABLE 17-continued

Effect of the co-additives composition on properties of polypropylene random copolymer modified with 0.25% of bis[2,4,6-trimethylbenzoyl]-phenylphosphineoxide and 0.125% of 4-dodecylbenzoyl-benzene after 4 min of UV-exposure.

| N° | Material/Formulation | MFR, [g/10 min] | $F_{break}$ [cN] |
|---|---|---|---|
| 17-3. | Modified polypropylene random copolymer containing 0.5% of TAC and 0.5% of TMPTMA | 0.4 | 14.4 |

TABLE 18

Effect of the co-additives composition on properties of polypropylene homopolymer modified with 0.25% of bis[2,4,6-trimethylbenzoyl]-phenylphosphineoxide and 0.125% of 4-dodecylbenzoyl-benzene after 4 min of UV-exposure.

| N° | Material/Formulation | MFR, [g/10 min] | $F_{break}$ [cN] |
|---|---|---|---|
| 18-0. | Unmodified polypropylene homopolymer | 3.3 | 5.6 |
| 18-1. | Modified polypropylene homopolymer containing 1% of TAC | 2.3 | 6.0 |
| 18-2. | Modified polypropylene homopolymer containing 1% of TMPTMA | 1.4 | 6.5 |
| 18-3. | Modified polypropylene homopolymer containing 0.5% of TAC and 0.5% of TMPTMA | 0.5 | 12.7 |

Results in Tables 17 and 18 show that the combination of allylic (TAC) and acrylic (TMPTMA) types of co-additives has a stronger effect on MFR reduction than the respective individual allylic and acrylic co-additives. The same results are found for the melt stiffness, i.e., $F_{break}$.

The invention claimed is:

1. A composition comprising components
   (A) at least one linear olefin polymer selected from the group consisting of a polyethylene homopolymer, a Polypropylene homopolymer, a polyethylene/polypropylene copolymer and blends thereof;
   (B) 0.05 to 2%, relative to the weight of component (A), of at least one photoinitiator; and
   (C) 0.05 to 5%, relative to the weight of component (A), of at least one co-additive containing one or more double bonds;
   where the at least one photoinitiator is a mixture of one or more benzophenone photoinitiators and one or more monoacylphosphine oxide and/or bisacylphosphine oxide photoinitiators.

2. The composition according to claim 1 comprising (A) at least one linear olefin polymer selected from the group consisting of a polyethylene homopolymer, a polypropylene homopolymer and a polypropylene random copolymer with ethylene.

3. The composition according to claim 1, wherein the at least one photoinitiator is a mixture of one or more benzophenone photoinitiators and one or more bisacylphosphine oxide photoinitiators.

4. The composition according to claim 1, wherein the at least one photoinitiator is a mixture of bis[2,4,6-trimethylbenzoyl]-phenylphosphineoxide and 4-dodecylbenzoylbenzene.

5. The composition according to claim 1, wherein the at least one co-additive is selected from the group consisting of ethene derivatives, propene derivatives, acrylic acid derivatives, methacrylic acid derivatives and diene derivatives.

6. The composition according to claim 1, wherein the at least one co-additive is selected from the group consisting of triallylcyanurate and trimethylolpropane tri methacrylate.

7. The composition according to claim 1, further containing a conventional additive selected from the group consisting of phosphites, phosphonites, phenolic antioxidants and 2,2,6,6-tetramethylpiperidine derivatives.

8. A modified olefin polymer resin obtained by reaction of the components (A), (B) and (C) as defined in claim 1.

9. A modified olefin polymer resin according to claim 8, wherein the reaction is initiated by UV radiation.

10. A molded or extruded article containing the modified olefin polymer resin according to claim 8.

11. A foam, thermoformed article, blown film, blown moulded article, fiber, filament or extrusion coating containing the modified olefin polymer resin according to claim 8.

12. A modified olefin polymer resin according to claim 8, which further contains a conventional additive selected from the group consisting of phosphites, phosphonites, phenolic antioxidants and 2,2,6,6-tetramethylpiperidine derivatives.

13. A process for preparing a modified olefin polymer resin, which process comprises preparing a solid polymer article made of a composition containing components
   (A) at least one linear olefin polymer selected from the group consisting of a polyethylene homopolymer, a polypropylene homopolymer, a polyethylene/polypropylene copolymer and blends thereof;
   (B) 0.05 to 2%, relative to the weight of component (A), of at least one photoinitiator; and
   (C) 0.05 to 5%, relative to the weight of component (A), of at least one co-additive containing one or more double bonds,
   and having a thickness of equal or less than 3 mm; and
   exposing the polymer article to light of 200 to 800 nm, at a radiation dose of 0.5 to 10 J/cm² and at a temperature below the melting temperature of the initial polymer article,
   where the at least one photoinitiator is a mixture of one or more benzophenone photoinitiators and one or more monoacylphosphine oxide and/or bisacylphosphine oxide photoinitiators.

14. A process according to claim 13, wherein the polymer article is in pellet form.

15. A process according to claim 13, wherein the light has a wavelength of 200 to 600 nm.

16. A process according to claim 13, wherein the radiation dose is 0.5 to 10 J/cm².

17. An UV irradiated composition comprising components
   (A) at least one linear olefin polymer selected from the group consisting of a polyethylene homopolymer, a Polypropylene homopolymer, a polyethylene/polypropylene copolymer and blends thereof;
   (B) 0.05 to 2%, relative to the weight of component (A), of at least one photoinitiator; and
   (C) 0.05 to 5%, relative to the weight of component (A), of at least one co-additive containing one or more double bonds;
   characterized in an improvement of the Stretching Force at melt break $F_{break}$ of at least 15% and/or an improvement of the corresponding drawn down Velocity $v_{break}$ of at least 15%, relative to $F_{break}$ and/or $v_{break}$ of the non UV irradiated composition, where the at least one photoinitiator is a mixture of one or more benzophenone photoinitiators and one or more monoacylphosphine oxide and/or bisacylphosphine oxide photoinitiators.

18. The composition according to claim 3 where the weight/weight ratio of benzophenone photoinitiators to bisacylphosphine oxide photoinitiators is from 1:10 to 10:1.

19. The composition according to claim 3 where the weight/weight ratio of benzophenone photoinitiators to bisacylphosphine oxide photoinitiators is from 1:1 to 1:5.

20. The composition according to claim 18 where the benzophenone is 4-dodecylbenzoylbenzene and the bisacylphosphine oxide is bis[2,4,6-trimethylbenzoyl]-phenylphosphineoxide.

21. The composition according to claim 19 where the benzophenone is 4-dodecylbenzoylbenzene and the bisacylphosphine oxide is bis[2,4,6-trimethylbenzoyl]-phenylphosphineoxide.

22. The composition according to claim 1 wherein component (C) is a mixture of triallylcyanurate and trimethylolpropane trimethacrylate.

23. The composition according to claim 1 wherein the at least one photoinitiator is present from 0.1 to 1%, relative to the weight of component (A).

24. The composition according to claim 1 wherein the at least one co-additive containing one or more double bonds is present from 0.5 to 2%, relative to the weight of component (A).

25. The composition according to claim 1 wherein the at least one photoinitiator is present from 0.1 to 1%, relative to the weight of component (A) and the at least one co-additive containing one or more double bonds is present from 0.5 to 2%, relative to the weight of component (A).

* * * * *